United States Patent [19]

Masak

[11] Patent Number: 4,591,856
[45] Date of Patent: May 27, 1986

[54] HAND OFF INTEGRATOR APPARATUS FOR SIGNAL DETECTION

[75] Inventor: Raymond J. Masak, East Northport, N.Y.

[73] Assignee: The United States of America as represented by the Secretary of the Air Force, Washington, D.C.

[21] Appl. No.: 559,168

[22] Filed: Dec. 8, 1983

[51] Int. Cl.⁴ .................... G01S 7/28; G06G 7/18; H03K 5/159
[52] U.S. Cl. .................... 343/17.1 R; 343/5 R; 328/127
[58] Field of Search .......... 343/17.1 R, 17.2 R, 343/5 VQ, 5 R; 328/127, 167; 329/145, 104; 364/516, 733, 830, 840; 307/520, 523, 522

[56] References Cited
U.S. PATENT DOCUMENTS

| | | | |
|---|---|---|---|
| 2,736,021 | 2/1956 | Sunstein | 343/17.2 |
| 3,571,629 | 3/1971 | Hilberman | 307/295 |
| 3,702,394 | 11/1972 | Rainsberger et al. | 235/183 |
| 3,716,780 | 2/1973 | Van Elk et al. | 325/324 |
| 3,971,993 | 7/1976 | Constant | 328/127 |

Primary Examiner—Thomas H. Tarcza
Assistant Examiner—Gilberto Barrón, Jr.
Attorney, Agent, or Firm—Donald J. Singer; William Stepanishen

[57] ABSTRACT

A hand off integrator apparatus utilizing first and second recirculating integrator units in series to integrate a series of input pulses in order to detect the presence of weak signals in a high background noise environment.

4 Claims, 4 Drawing Figures

4,591,856

HAND OFF INTEGRATOR APPARATUS FOR SIGNAL DETECTION

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a signal detector apparatus, and in particular to a hand off integrator apparatus for signal detection.

In a radar system, the video signal which is the result of target-reflected echoes coaprises a series of pulses which occur periodically at the repetition frequency of the radar system. Random signals which are the result of the combined effects of ground or sea clutter and noise signals that are generated within the receiver of the radar system are superimposed on the series of target-reflected echo pulses. This random clutter signal causes the real target signal to be masked, thereby making it difficult, if not impossible to detect small targets.

In order to improve the signal-to-noise and the signal-to-clutter ratio of a radar system, a type of integrator circuit which is commonly known as a sweep integrator, has been developed. Basically, a sweep integrator consists of a memory circuit, such as an ultrasonic delay line, with a controlled feed-back circuit coupling the output of the memory circuit to the input in order to form a recirculating signal loop. The delay time of the memory circuit must be chosen to be equal to the radar pulse repetition period. Radar video signals are introduced into the recirculating signal loop in which they are combined with previously introduced radar video signals. An output signal which is proportional to the amplitude of a selected characteristic of the combined signal is derived from the recirculating loop. Since the integrator stores and integrates all the echoes that are received from a particular radar sweep, it is called a sweep integrator.

Sweep integrators operate on the principle that the frequency distribution of a recurrent series of pulses is a line spectrum with the lines located at harmonics of the pulse repetition frequency. In comparison, the spectrum of random noise and certain types of clutter signals is more or less uniformly distributed over the entire video passband. The sweep integrator is generally arranged such that periodic signals which represent echoes from targets add linearly in the recirculating loop while aperiodic signals, which are the result of clutter and thermal noise, add in the more gradual, root means square manner. As a result, the signal-to-noise and/or clutter ratio on the recirculating loop is greater than the corresponding ratio of the non-integrated signal. The improvement of the signal-to-noise and/or clutter ratio is a function of the number of successive pulse series which are stored as a sum in the recirculating loop. In a typical application of the sweep integrator it may be desirable to store with appreciable strength the sum of as many as 50 to 100 successive series within the recirculating loop. In order to achieve optimum storage of 50 to 100 successive series with exponential memory (based on the criterion of peak signal to R.M.S. noise) the feedback factor must be equal to 0.98 or 0.99. The feedback factor will approach the value 1 as the number of series to be stored increases but must average less than 1 if the system is to be stable or non-oscillatory.

SUMMARY OF THE INVENTION

The present invention utilizes a pair of integrator units in series to enhance the presence of weak signals which may be masked by system noise levels. The first integrator unit outputs one signal pulse to the second integrator for every predetermined number of signal pulses, N, it receives. The second integrator unit outputs an output signal pulse for every predetermined number of signal pulses, N, it receives. The integration procedure is continued until each integrator unit has integrated signal samples which correspond to a predetermined number of range bins M and therefore has integrated a total of $N^2$ samples.

It is one object of the present invention, therefore, to provide an improved hand off integrator apparatus.

It is another object of the invention to provide an improved hand off integrator apparatus which sequentially integrates a large sample signals.

It is another object of the invention to provide an improved hand off integrator apparatus which efficiently integrates a sample of a predetermined number of signal pulses.

It is another object of the invention to provide an improved hand off integrator apparatus which utilizes a pair of integrator units that are sequentially connected.

It is still another object of the invention to provide an improved hand off integrator apparatus in which each integrator unit integrates samples that are contained in a predetermined number of range bins.

It is yet another object of the invention to provide an improved hand off integrator apparatus wherein a total of $N^2$ samples are effectively integrated by using the hand off technique where N equals the number signal pulses.

These and other advantages, objects and features of the invention will become more aparent from the following description taken in connection with the illustrative embodiment in the accompanying drawings.

DESCRIPTION OF THE PREFERRED EMBODIMENT

Figure 1:
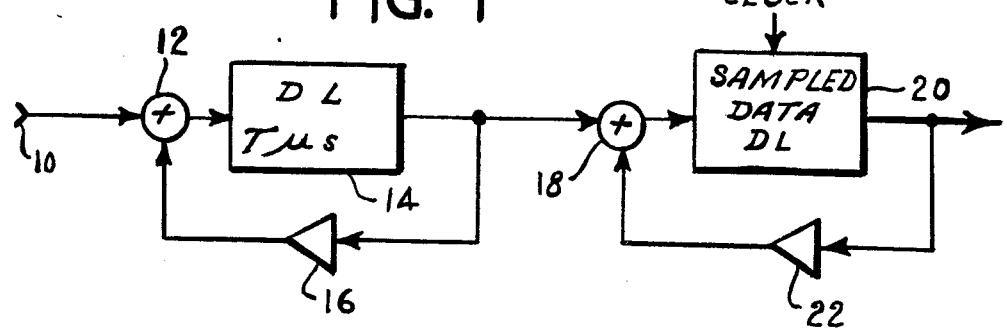
FIG. 1 is a block diagram of the hand off integrator apparatus for signal detection according to the present invention, and, FIGS. 2a, 2b and 2c are graphical representations of signal waveforms that are utilized and generated by the hand off integrator apparatus.
Figure 2A:
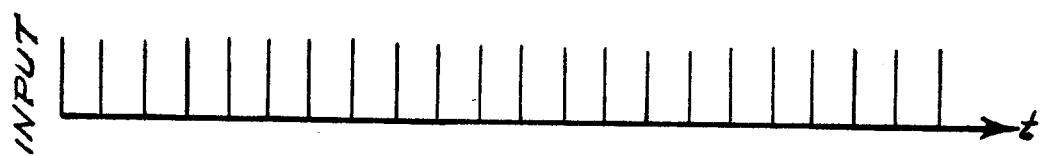
Figure 2B:
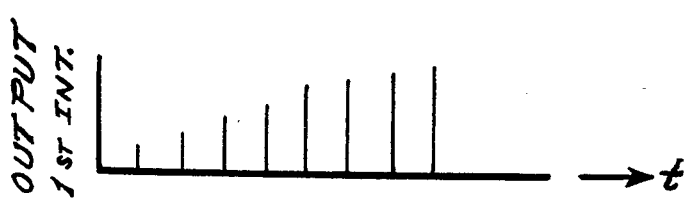

Referring now to FIG. 1, there is shown a hand off integrator apparatus having an input terminal 10 to receive radar return signals. The input signals of the type that are applied to terminal 10 are shown in FIG. 2a. For the purpose of illustration, it may be clearly seen that the input signals comprise a series of uniformly spaced pulses. It should be noted, however, that radar returns are usually complex and that the present example is an extreme simplification for the sake of the present discussion. The input signals from terminal 10 are applied to a summing unit 12 which in turn is connected to the delay line unit 14. The delay line unit 14 has a predetermined time delay, T, which is measured in microseconds. The output of the delay line unit 14 is coupled by an amplifier unit 15 to the summing unit 12. The output signals from the delay line unit 14 pass through the amplifier unit 16 and are added to the input signals in summing unit 12. The combined signal from the summing unit 12 is applied to the delay line unit 14. The delay line unit 14 may be any suitable conventional delay line such as an analog delay line or an analog CCD delay line device. It is necessary that the amplifier unit 16 have a gain factor of less than one in order that the integrator unit be stable or non-oscillatory. The output wavefront from the first integrator unit is shown in FIG. 2b.

Figure 2C:
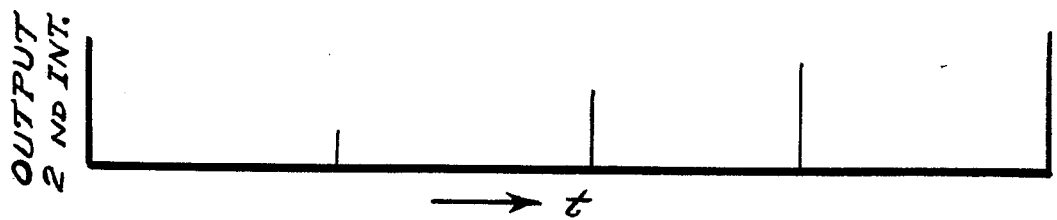

The output from the first integrator unit which comprises the delay line unit 14, the amplifier unit 16 and the summing unit 12, is applied to the second summing unit 18. The output signal from the first integrator unit is the result of a series of integrations which have the general form as is shown in FIG. 2b. The output signal from the second summing unit 18 is applied to a sampled data delay line unit 20. A clock signal is applied to the sampled data delay line unit 20 in order that the signal into the delay line unit 20 will occur only at a predetermined rate. This predetermined rate is controlled by the frequency of the clock signal and is a function of the radar signal repetition rate. The output signal from the sampled data delay line unit 20 is applied through the amplifier unit 22 to the second summing unit 18. The signal from the amplifier unit 22 is combined in the second summing unit 18 with the output signal from the first integrator unit and applied to the sampled data delay line unit 20. The second integrator unit comprises the sampled data delay line unit 20, the amplifier unit 22 and the second summing unit 18. The output signal from the second integrator unit is shown in FIG. 2c. The second integrator unit must be capable of holding data between sample intervals and therefore must be a sampled data type such as an analog CCD type or an all digital type. The second amplifier unit 22 must have a gain factor of less than one to be non-oscillatory.

There was shown and described in the FIG. 1, a hand off integrator apparatus for determining the presence of weak signals near the system noise level requiring the integration of a relatively large number of signal samples to effectively increase signal to noise ratio to ensure a high detection probability and a low false alarm probability. A typical integrator consisting of a recirculating delay line is constrained by practical limitations to achieve an effective integration of a relatively small set of samples (i.e., 20). The hand off integrator apparatus as shown in the FIG. 1 is designed to circumvent this limitation. As therein shown, a pair of integrators units 14, 20 are connected sequentially. For the purpose of explanation, it will be assumed that one integrator is capable of efficiently integrating 20 samples. It should be noted that a larger or small sample could be used and that 20 samples is used merely for illustration purposes only. At the end of the twentieth sample, the output of the first integrator unit is read into the second integrator and held for a period corresponding to twenty samples (20T). At this time the output of the first integrator unit is read into and added to the first set of samples. This procedure is repeated twenty times. The number of signal samples integrated and the number of range bins are independent quantities. For example, there could be twenty samples of each range bin where the number of range bins could be 200 or any other number. Thus, if each integrator unit in effect integrates N samples (where N=20) which are contained in M range bins and M equals 20, a total of 400 samples are effectively integrated by using the hand off approach. The first integrator unit can be a conventional type using an analog delay line, while the second integrator unit must be a sampled data type that may be implemented by an analog CCD device.

It should be noted that, although the present apparatus has been described with respect to a radar application, the above described techniques and principles also apply to communication systems. Communications systems that employ spread spectrum, i.e., pseudo noise coding, require detection and synchronization of the received signal with an internally generated reference signal. This is normally accomplished with a coherent matched filter that is matched to receive code segments and a non-coherent integrator. The matched filter output consists of a sequence of pulses which are then integrated, as in the radar example, to enhance the signal to noise (S/N) ratio required to increase probability of signal detection and reduce false alarm rate.

Although the invention has been described with reference to a particular embodiment, it will be understood to those skilled in the art that the invention is capable of a variety of alternative embodiments within the spirit and scope of the appended claims.

What is claimed is:

1. A hand off integrator apparatus for signal detection comprising in combination:
    a first means for integrating an input signal, said first integrating means receiving a series of input pulses as input signal, said first integrating means providing an output pulse signal for each of a predetermined number of said series of input pulses, said predetermined number for said series of input pulses is twenty, and,
    a second means for integrating a pulse signal, said second integrating means operating at a predetermined sample rate, said second integrating means receiving said output pulse signal from said first integrating means, said second integrating means integrating said output pulse signal to provide an output integration signal which is proportioned to the data received during said predetermined sample rate, said first and second integrating means each respectively comprise a recirculating integrator means, said second integrating means receives a clock signal which sets said predetermined sample rate, said predetermined sample rate being equal to the number of samples integrated in said first integrating means.

2. A hand off integrator apparatus as described in claim 1 wherein said input signal is received from a rader system, said rader system having a system repetition rate, and, said clock signal has a frequency equal to the radar system repetition rate from which it receives input signals.

3. A hand off integrator apparatus as described in claim 1 wherein said first integrating means comprises in combination:
    a summing means having a first and second input and an output, said summing means receiving said input signal at said first input, said summing means providing said input signal at said output,
    a means for storage to receive and store said input signal for a predetermined time, said storage means receiving said input signal from said summing means, said storage means providing an output pulse after said predetermined time has lapsed, and,
    an amplifier means receiving the output pulse from said storage means, said amplifier means amplifying said output pulse and applying it to said second input of said summing means, said summing means combining said output pulse with said input signal and applying the combination signal to said storage means.

4. A hand off integrator apparatus as described in claim 1 wherein said second integrating means comprises in combination:

a summing means having a first and second input and an output, said summing means receiving said input signal at said first input, said summing means providing said input signal at said output, a means for storage to receive and store said input signals at a predetermined sample rate, said storage means receiving said input signal from said summing means, said storage means providing an output pulse after said predetermined sample rate has occurred, and, an amplifier means receiving the output pulse from said storage means, said amplifier means amplifying said output pulse and applying it to said second input of said summing means, said summing means combining said output pulse with said input signal and applying the combined signal to said storage means.

* * * * *